United States Patent
Anatole et al.

(10) Patent No.: US 10,406,649 B2
(45) Date of Patent: Sep. 10, 2019

(54) MACHINE FOR ACQUIRING IMAGES OF OPTICAL LENSES AND METHOD OF TRIMMING OPTICAL LENSES

(71) Applicant: ESSILOR INTERNATIONAL (COMPAGNIE GENERALE D'OPTIQUE), Charenton-le-Pont (FR)

(72) Inventors: Vincent Anatole, Charenton-le-Pont (FR); Cedric Sileo, Saint Quentin en Yvelines (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 246 days.

(21) Appl. No.: 15/328,507

(22) PCT Filed: Jul. 23, 2015

(86) PCT No.: PCT/FR2015/052032
§ 371 (c)(1),
(2) Date: Jan. 24, 2017

(87) PCT Pub. No.: WO2016/012720
PCT Pub. Date: Jan. 28, 2016

(65) Prior Publication Data
US 2017/0209977 A1    Jul. 27, 2017

(30) Foreign Application Priority Data
Jul. 25, 2014 (FR) ..................... 14 57240

(51) Int. Cl.
*B24B 1/00* (2006.01)
*B24B 49/12* (2006.01)
(Continued)

(52) U.S. Cl.
CPC ............... *B24B 9/148* (2013.01); *B24B 1/00* (2013.01); *B24B 49/12* (2013.01); *G01B 11/24* (2013.01); *G06T 7/60* (2013.01)

(58) Field of Classification Search
CPC ........... B24B 9/148; B24B 1/00; B24B 49/12; G01B 11/24; G06T 7/60
(Continued)

(56) References Cited

U.S. PATENT DOCUMENTS

| 5,428,448 A | 6/1995 | Albert-Garcia |
| 5,604,583 A * | 2/1997 | Byron .................... B23Q 17/24 346/125 |

(Continued)

FOREIGN PATENT DOCUMENTS

| CN | 102645758 | 8/2012 |
| EP | 2 489 466 A2 | 8/2012 |

(Continued)

OTHER PUBLICATIONS

International Search Report, dated Nov. 4, 2015, from corresponding PCT application.

*Primary Examiner* — Patricia I Young
(74) *Attorney, Agent, or Firm* — Young & Thompson

(57) ABSTRACT

Disclosed is a machine for acquiring images (1) including:
a support (10) for optical lens,
on one side of the support, a light source (20),
on the other side of the support, an image sensor (30) suitable for capturing at least two images of the optical lens illuminated by the light source, viewed from two different angles.

10 Claims, 3 Drawing Sheets

(51) Int. Cl.
   *B24B 9/14*      (2006.01)
   *G01B 11/24*    (2006.01)
   *G06T 7/60*     (2017.01)

(58) Field of Classification Search
   USPC .......................................................... 348/94
   See application file for complete search history.

(56) References Cited

U.S. PATENT DOCUMENTS

| | | | |
|---|---|---|---|
| 5,686,960 A * | 11/1997 | Sussman | G02B 26/106 |
| | | | 348/218.1 |
| 8,320,710 B2 | 11/2012 | Pinault | |
| 2002/0176756 A1* | 11/2002 | Gottschald | B24B 9/148 |
| | | | 409/132 |
| 2009/0213322 A1* | 8/2009 | Urabe | B24B 9/146 |
| | | | 351/44 |
| 2012/0156636 A1* | 6/2012 | Stock | A61B 5/0088 |
| | | | 433/29 |

FOREIGN PATENT DOCUMENTS

| | | |
|---|---|---|
| FR | 2 910 644 A1 | 6/2008 |
| WO | 96/29177 A1 | 9/1996 |
| WO | 2008/093332 A2 | 8/2008 |

\* cited by examiner

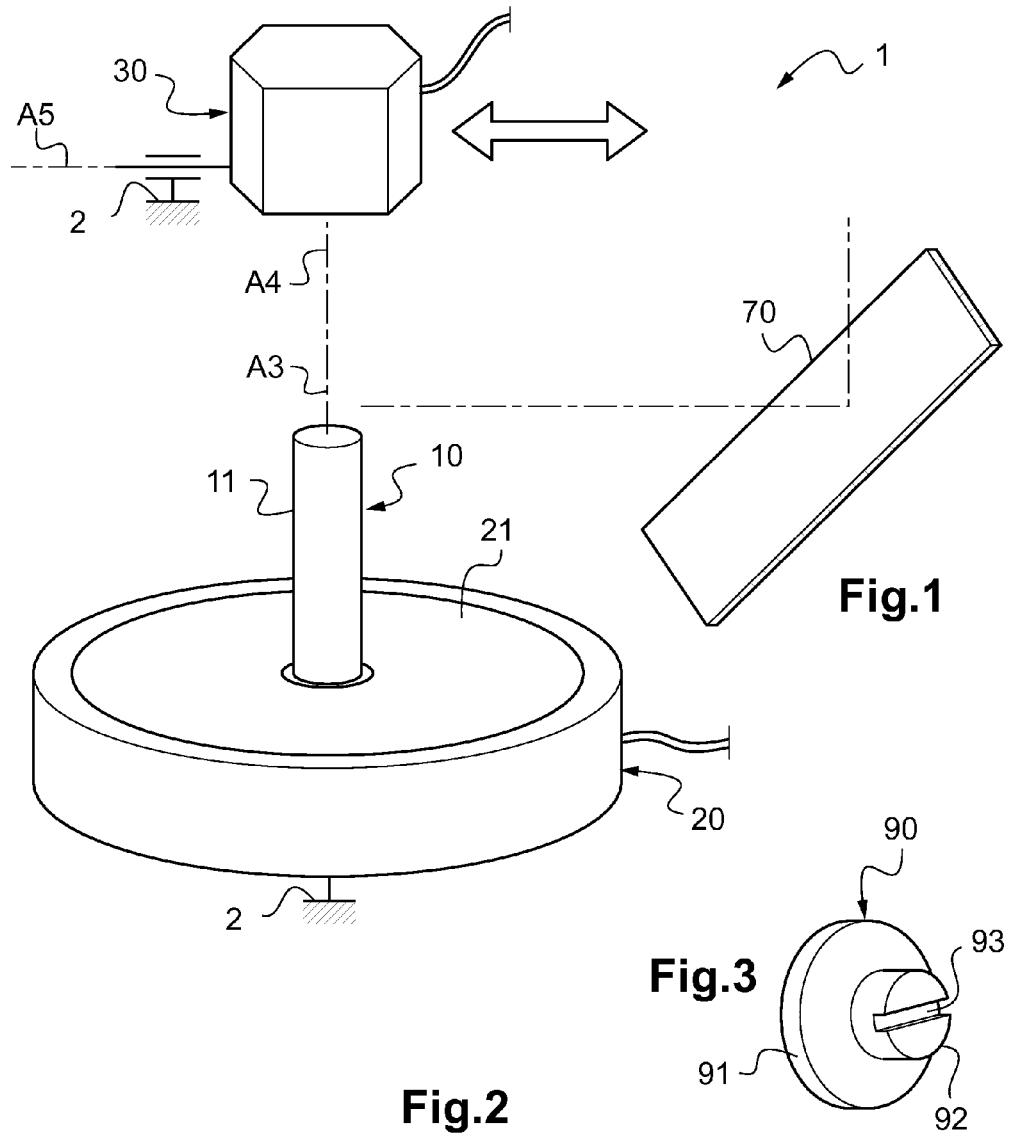
Fig.1
Fig.3
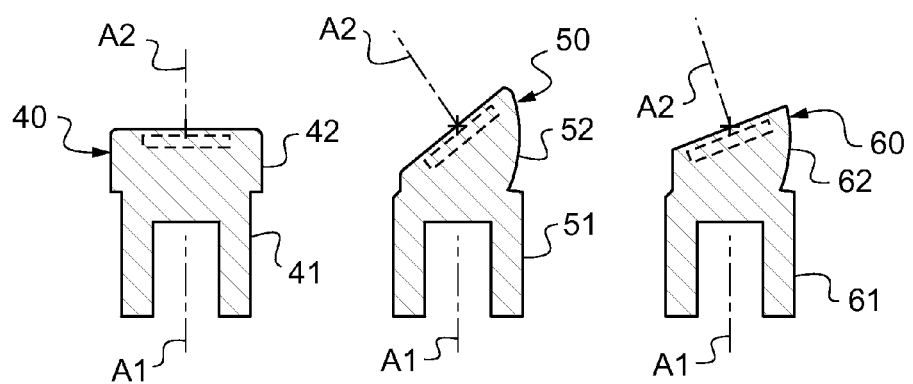
Fig.2

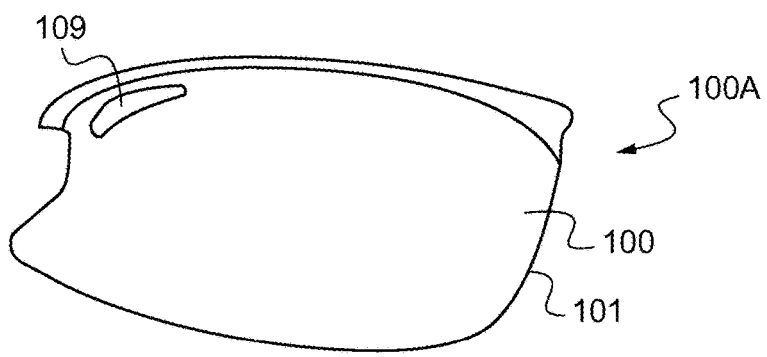
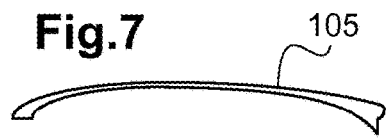
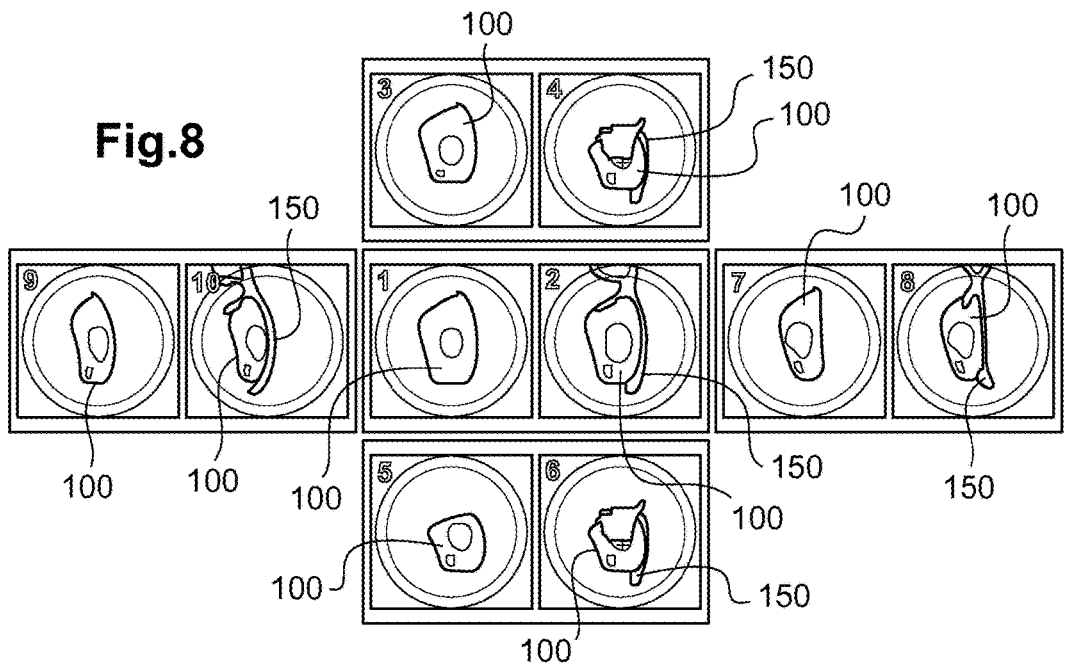

ent invention relates generally to the trimming of
MACHINE FOR ACQUIRING IMAGES OF OPTICAL LENSES AND METHOD OF TRIMMING OPTICAL LENSES

TECHNICAL FIELD OF THE INVENTION

The present invention relates generally to the trimming of optical lenses with a view to their mounting in a spectacle frame.

It relates more particularly to a machine for acquiring images of optical lenses.

It also relates to a method of determining a guideline for trimming an optical lens to be trimmed with a view to its mounting in a spectacle frame in which a reference optical lens is already mounted.

PRIOR ART

The technical part of an optician's job consists in mounting a pair of optical lenses on a spectacle frame selected by a wearer.

This mounting operation can be divided into three main operations:
  the acquisition of the geometry of the interior outline of one of the eyewires of the selected spectacle frame,
  the centring of the lens considered which consists in positioning and in orienting this outline appropriately on the lens in such a way that once mounted in its frame, this lens is correctly positioned with respect to the corresponding eye of the wearer so that it can best accomplish the optical function for which it has been designed, and then
  the trimming of the lens which consists in machining its outline to the desired shape.

The trimming operation consists in eliminating the superfluous peripheral part of the optical lens concerned, so as to restore the outline thereof, which is usually initially circular, to an outline of identical shape to that of the outline of the eyewire of the spectacle frame or of approximate shape.

The quality of this trimming operation depends in large part on the precision of the operation of acquiring the shape of the outline of the eyewire of the spectacle frame.

Specifically, when the spectacle frame is rimmed, this acquisition operation generally consists, for the optician, in probing the interior outline of the eyewire of the spectacles frame selected so as to precisely determine the coordinates of points characterizing the shape of the outline of this eyewire.

In order to carry out this operation, the optician uses a notch outline reading apparatus such as that described in document EP 0819967 or else such as that described in document EP 1037008. These apparatuses comprise a prober which is able to pivot about an axis of rotation normal to the mid-plane of the frame and which comprises a probing finger pointing along an axis orthogonal to this axis of rotation. The probing finger comprises in particular an end able to be inserted into the notch of the eyewire so as to determine the spatial coordinates of the outline of the eyewire.

The objective of this operation is in particular to follow very exactly the bottom of the notch in the eyewire so as to be able to store a precise digital image of the geometry of the curve running along the bottom of the notch.

When the spectacle frame is of rimless type (the lenses then being drilled), use is made of blanks (that is to say generally the reference lenses supplied to the optician together with the spectacle frame). An optical acquisition then makes it possible to read off the outline of these blanks as well as the position of the drill holes.

In the case of rimmed frames, it may happen that the probing finger escapes from the notch when the frame is strongly curved, this being the case in particular with frames for sports sunglasses.

In the case of cambered lenses, the acquisition of images does not make it possible to obtain sufficient precision to acquire complex shapes of the outlines of the blanks, especially if these lenses are used in rimmed or semi-rimless frames.

The use of a telecentric objective to acquire the image of the blank makes it possible to solve certain problems of precision which are related to the curvature of the lens, but on account of its complexity, such an objective unfortunately turns out to be expensive.

SUBJECT OF THE INVENTION

In order to remedy the aforementioned drawbacks of the prior art, the present invention proposes an optical procedure for acquiring the outline of the eyewire of the spectacle frame.

More particularly, there is proposed according to the invention a machine, such as defined in the introduction, for acquiring images, comprising:
  a support for a reference optical lens,
  a light source,
  an image sensor suitable for capturing at least two images of the reference optical lens viewed from two different angles.

It also relates to a method of determining a guideline for trimming an optical lens to be trimmed with a view to its mounting in a spectacle frame in which at least one reference optical lens is initially mounted, comprising steps:
  a) of removing the said reference optical lens and of fixing the said reference optical lens on a support of a machine for acquiring images,
  b) of acquiring, with an image sensor of the said machine for acquiring images, at least two images of the said reference optical lens viewed from two different angles,
  c) of processing the said at least two images so as to deduce therefrom trimming parameters for the said optical lens to be trimmed, and
  d) of devising the said trimming guideline as a function of the said trimming parameters.

The reference optical lens is a lens which is initially situated in the spectacle frame. In practice, it will generally be a demonstration lens, that the optician will wish to replace with a lens to be trimmed, this lens to be trimmed exhibiting for example optical powers suitable for the visual acuity of the future spectacle wearer.

Thus, by virtue of the invention, even in the case of rimmed spectacle frames, the shape according to which it will be necessary to trim this lens is determined, not necessarily on the basis of the shape of the eyewire of the spectacle frame, but rather on the basis of the shape of the reference lens initially mounted in this spectacle frame.

Consequently, it is possible to easily acquire at least two images of the demonstration lens, so as to obtain three-dimensional data relating to the shape of this demonstration lens. These three-dimensional data will thereafter make it possible to machine the lens to be trimmed with high precision.

Thus, in an embodiment of the invention, these two images will be able to be taken one face-on and the other in profile by a non-telecentric objective, the image of the lens viewed in profile making it possible to determine the radius of curvature of the lens. Then, by virtue of this radius of curvature, it will be possible to determine the distance at any point separating the lens and the non-telecentric objective, and this will make it possible to scale the image of the lens viewed face-on.

Other advantageous and nonlimiting characteristics of the machine in accordance with the invention are as follows:

- the said image sensor and the said light source are disposed on either side of the reference optical lens carried by the support;
- the said image sensor and the said light source are disposed on one and the same side of the reference optical lens carried by the support;
- the said support comprises a stand and a set of at least two locking caps, each locking cap comprising a gripping part for its fixing onto the said stand according to a first axis, and an accommodating part for its fixing to the said reference optical lens according to a second axis, the angle of inclination between the first axis and the second axis varying from one locking cap to the other;
- there is provided a chassis and the support comprises a locking cap for the fixing of the said reference optical lens, which is mounted mobile with respect to the chassis with at least two mobilities of rotation about two non-parallel axes;
- the said support comprises a rod and the said light source comprises a lighting part which extends right around the rod;
- there is provided a mirror, and the image sensor and the support are mounted mobile with respect to one another, between a first position in which the support is situated in the field of the image sensor and a second position in which the mirror is situated in the field of the image sensor;
- the image sensor comprises a non-telecentric objective.

The following are other advantageous and nonlimiting characteristics of the method according to the invention:

- the image sensor comprising a non-telecentric objective, in step c), a radius of curvature of one of the faces of the said reference optical lens is acquired, and each image acquired is scaled as a function of the said radius of curvature;
- in step b), the said at least two images are acquired successively, a mirror being placed in the optical path of the image sensor between the two image acquisitions;
- in step b), the said at least two images are acquired successively, while inclining, between the two image acquisitions, the said reference optical lens with respect to the image sensor by a known angle about an axis of rotation which passes through the boxing centre of the reference optical lens;
- in step b), at least one image of the reference optical lens mounted in the spectacle frame is also acquired, and in step c), the said image is processed so as to deduce therefrom at least one of the said trimming parameters;
- in step b), one of the two images of the reference optical lens is acquired side-on, in such a way that the reference optical lens extends in a mid-plane substantially parallel to an axis of the optical path of the said image sensor and, in step c), the radius of curvature of one of the optical faces of the reference optical lens is determined;
- in step b), one of the two images of the reference optical lens is acquired face-on, in such a way that the reference optical lens extends in a mid-plane substantially orthogonal to an axis of the optical path of the said image sensor and, in step c), the two-dimensional shape of the outline of the reference optical lens is read off on the image acquired face-on;
- in step c) a search is conducted for each drill hole of the reference optical lens, for each drill hole found, the image is selected on which the outlines of the front and rear openings of the said drill hole are the closest, and at least one trimming parameter is assigned to the characterization of the shape and of the position of the said drill hole on the selected image.

Formulated otherwise, when the drill hole is a through hole, a search is conducted for the image on which the shadow of the drill hole considered is the smallest (thus signifying that on this image, the two openings of the hole are almost or indeed completely superimposed), and the drill hole is characterized on the basis of the data read off on this image.

When the drill hole opens out on just one side of the lens (whether or not the former exhibits a circular cross-section), the image will for example be able to be selected manually by the optician, on an image of the lens viewed face-on so as to determine the approximate position thereof.

DETAILED DESCRIPTION OF AN EXAMPLE EMBODIMENT

The description which follows with regard to the appended drawings given by way of nonlimiting examples will clearly elucidate the essence of the invention and the manner in which it may be carried out.

In the appended drawings:

FIG. 1 is a schematic view of a machine for acquiring images according to the invention;

FIG. 2 is a sectional schematic view of a set of three locking caps belonging to the machine for acquiring images of FIG. 1;

FIG. 3 is a schematic view in perspective of a locking gland suitable for being stuck onto a lens;

FIG. 6 represents an image viewed face-on of an optical lens;

FIG. 7 is a view of a part of the optical lens of FIG. 6, that which will be covered by the spectacle frame; and FIG. 8 represents ten photos of an optical lens viewed from five different angles, with and without spectacle frame.

Figure 4:
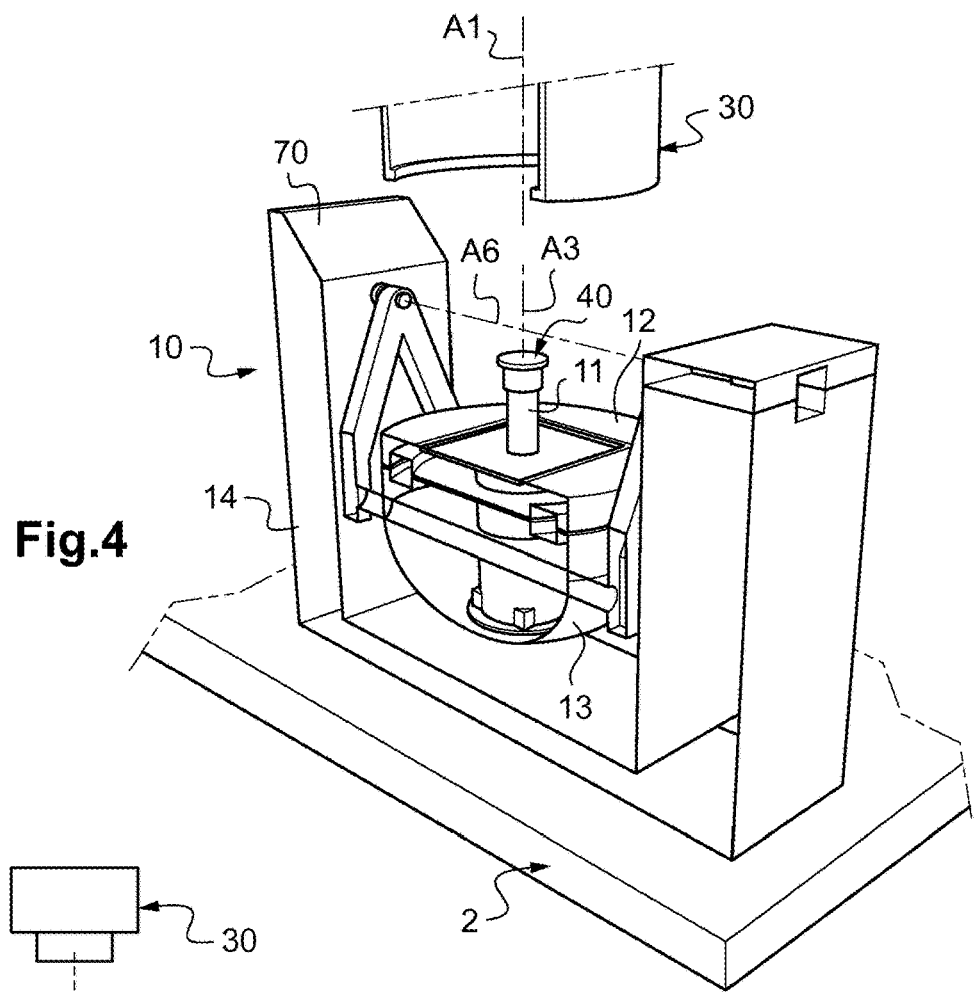
FIG. 4 is a schematic view in perspective of a variant embodiment of the support of the machine for acquiring images of FIG. 1.

There exist three principal categories of spectacle frames, namely; rimmed spectacle frames, semi-rimless spectacle frames (also called browline frames) and rimless spectacle frames (also called drilled frames).

Rimmed spectacle frames conventionally comprise two eyewires which are each intended to accommodate a trimmed optical lens. These two eyewires are connected together by a bridge and each carries a temple. Each eyewire exhibits a groove, or notch, which runs along its interior face.

When the spectacle frame is rimmed, the optical lens must be trimmed so as to exhibit along its edge a fitting rib, commonly called a bezel, whose cross-section generally exhibits a V shape. The bezel thus formed on the edge of the lens is then suitable for fitting into the notch of the rimmed frame.

Semi-rimless spectacle frames comprise two brows on the interior faces of which there extend ribs, as well as two holding threads which are joined to the ends of the brows to form with the latter closed outlines.

When the spectacle frame is semi-rimless, the optical lens must be trimmed so as to exhibit hollowed out along its edge a peripheral groove. The lens is then held in place in the spectacle frame by fitting the upper part of its edge in the rib provided along the internal face of the corresponding brow, and by engaging the holding thread in the groove.

Finally, rimless spectacle frames comprise two temples and a bridge, but are devoid of eyewire or brow. These temples and this bridge are on the other hand furnished with studs suitable for being inserted into drill holes previously made in the optical lenses.

When the spectacle frame is rimless, the optical lens must be trimmed so as to exhibit an edge whose cross-section is right, and then be drilled in such a way that the bridge and the corresponding temple of the spectacle frame can be securely fixed thereto.

The optician's job is therefore to mount a pair of brand new lenses (one speaks of "optical lenses to be trimmed") on the spectacle frame selected by the wearer.

This may entail a brand new spectacle frame, or a used spectacle frame (case where the spectacle wearer wishes to change their optical lenses while keeping their spectacle frame).

In the case where it is brand new, the spectacle frame is generally supplied to the optician with zero-power presentation lenses (or blanks).

In the case where it is used, the spectacle frame is generally supplied to the optician with optical lenses to be replaced.

These optical lenses which are initially situated in the spectacle frame (brand new or used) will hereinafter in this account be referred to by the expression "reference lenses".

Before trimming brand new optical lenses so as to replace these reference lenses, the optician must implement an operation of acquiring the outline according to which each brand new optical lens will have to be trimmed.

Here, this acquisition will be operated not necessarily as a function of the shape of the spectacle frame, but rather as a function of the shape of the reference lenses which are initially situated in the spectacle frame. In this manner, the method used will apply equally well to rimmed spectacle frames, to semi-rimless spectacle frames and to rimless spectacle frames.

As shown by FIG. 1, the invention thus pertains to a machine for acquiring images 1 making it possible to acquire images, viewed from different angles, of a reference lens.

This machine for acquiring images 1 comprises for this purpose:
  a chassis 2,
  a support 10 for a reference lens,
  on one side of the support 10, a light source 20,
  on one side or on the other side of the support 10, an image sensor 30 suitable for capturing at least two images of the reference lens viewed from two different angles.

To acquire two images of the reference lens from two different angles, provision could be made to mount the image sensor 30 in such a way that it is mobile with respect to the chassis 2 and/or to mount the reference lens on the support 10 in such a way that it is mobile with respect to the chassis 2.

In the embodiment of the machine for acquiring images 1 represented in FIG. 1, the support 10 comprises a rod 11 whose free end is suitable for supporting a locking cap, this locking cap being provided to receive the reference lens.

This rod 11 is here straight. It extends along a principal axis A3, which is in practice vertical. Here, this rod 11 is fixed to the support 2 by its bottom end.

The light source 20 here comprises a direct lighting system 21, which makes it possible to illuminate the reference lens from the underside, that is to say opposite from the image sensor 30 with respect to the lens.

This direct lighting system 21 comprises a disc shaped translucent plate, through whose centre the rod 11 passes in such a way that the disc extends right around the rod 11.

Various luminous sources, such as light-emitting diodes, make it possible to illuminate this translucent plate from the underside, in such a way that it forms an extended light source.

As a variant, provision could be made to supplement or to replace this direct lighting system 21 with a lateral lighting system (not represented) illuminating the reference lens through its edge. This lateral lighting system will be able to be placed on the side of the rod 11, level with the height of the top side or of the underside of the free end of this rod 11, so as to illuminate the reference lens carried by this rod 11.

The image sensor 30 is for its part formed by a digital camera.

This digital camera could comprise a telecentric objective. The use of a telecentric objective would make it possible to retain one and the same magnification ratio of the lens whatever the picture taking distance. Unfortunately, such an objective is very complex to manufacture.

This is the reason why here the objective chosen is non-telecentric (it is therefore an entocentric objective).

Here, it is then proposed, as will be well described hereinafter in this account, to process the images acquired in such a way as to take account of the changes of scales due to the variations in picture taking distances, in such a way as to obtain results that are as precise as those that would be obtained by using a telecentric objective.

The image sensor 30 is mounted here on the chassis 2 in such a way that its optical axis A4 remains parallel to the principal axis A3 of the rod 11 of the support 10.

It is here more precisely mounted mobile on the chassis 2 in such a way that it can acquire not only a face-on image of the reference lens, but also a side-on image of this lens, without it being necessary for this purpose to move the reference lens.

For this purpose, the image sensor 30 is mounted on the chassis 2 with a mobility of translation along an axis A5 perpendicular to its optical axis A4. It is thus mobile between a base position in which its optical axis A4 coincides with the principal axis A3 of the rod 11, and a retracted position in which its optical axis A4 is strictly parallel to the principal axis A3.

Here a mirror 70 is furthermore provided, which makes it possible, when the image sensor 30 is in the retracted position, to reflect an image on the side of the reference lens towards this image sensor 30.

This mirror 70 extends to this effect in a plane whose normal at the centre of the mirror cuts the principal axis A3 with an angle of inclination of 45 degrees.

This mirror 70 is thus positioned in such a way that, when the image sensor 30 is in the retracted position, the mirror 70 is situated in the field of the image sensor.

Figure 5:
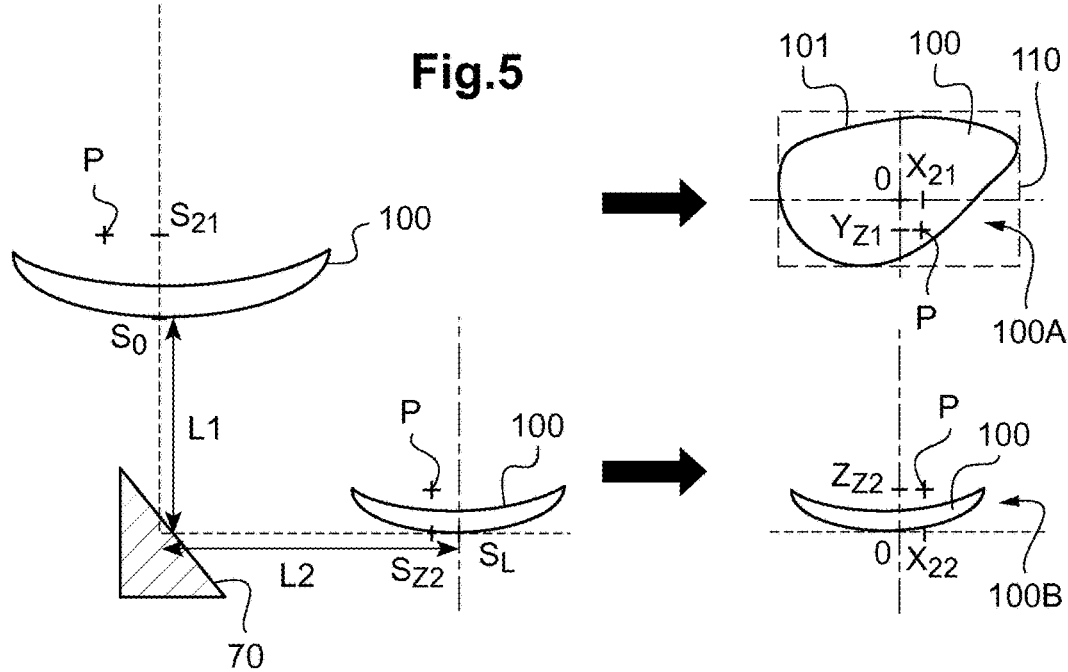
FIG. 5 is a schematic side-on view illustrating the acquisition of two images of a lens by means of the machine for acquiring images of FIG. 1.

As shown by FIG. 5, the mobility of the image sensor 30 and the use of the mirror 70 therefore make it possible to acquire two images 100A, 100B of the reference lens 100, viewed from two different angles. These two images will, hereinafter in this account, be called the face-on image 100A and the side-on image 100B.

As a variant, provision could be made for the image sensor to remain stationary, and for the mirror to be mobile so as to shift into the field of the image sensor in order to return to the latter a side-on image of the lens (via for example other mirrors).

In the present invention, when the reference lens is drilled, one wishes to acquire at least one other image of the reference lens, viewed from another angle.

Indeed, the face-on and side-on views alone of the lens do not make it possible to precisely characterize the shapes and positions of the drill holes provided in the reference lens.

For this purpose, the present invention proposes to acquire other images, on which the drill holes are substantially situated on the axis of the image sensor 30.

In FIG. 3, a locking gland 90 has been represented. Such a locking gland comprises a plate 91 clad with a double-sided self-adhesive tape to be stuck onto the lens. It also comprises an axisymmetric cylindrical pin 92, which is provided so as to be easily grasped with a view to facilitating the gripping of the lens.

In this FIG. 3, it is observed that the pin 92 exhibits a groove 93 hollowed out in its end face, which extends across the diameter of this pin and which provides an indication of the orientation of the lens about the axis of the pin 92.

As shown by FIG. 2, the machine for acquiring images 1 is then equipped with a set of at least two different locking caps.

Three locking caps 40, 50, 60 are provided here.

Each locking cap 40, 50, 60 comprises:
a gripping part 41, 51, 61 for its fixing onto the rod 11 according to a first axis A1, and
an accommodating part 42, 52, 62 for its fixing to the locking gland 90 according to a second axis A2, the angle of inclination between the first axis A1 and the second axis A2 varying from one locking cap 40, 50, 60 to the other.

Here, the gripping parts 41, 51, 61 of the three locking caps 40, 50, 60 are identical. They are provided so as to be fixed to the rod 11 by nest-fitting. They then take the form of symmetric sleeves of revolution about the first axis A1. These sleeves exhibit interior diameters identical (to within the mounting play) to the exterior diameter of the rod 11, thereby affording them good stability on the free end of the rod 11.

As far as the accommodating parts 42, 52, 62 of the three locking caps 40, 50, 60 are concerned, they are provided so as to be fixed to the pin 92 of the locking gland 90. They each comprise for this purpose a cavity making it possible to house the pin 92.

As is depicted dashed in FIG. 2, the cavity hollowed out in each accommodating part 42, 52, 62 is traversed by a rib which is provided so as to be housed in the groove 93 of the pin 92. In this manner, it is ensured that the orientation of the lens about the axis A3 of the rod 11 does not change when the lens is positioned successively on the three locking caps 40, 50, 60.

Here, the upper faces of these accommodating parts 42, 52, 62 exhibit identical shapes, but they are oriented differently with respect to the gripping parts 41, 51, 61.

The axis of symmetry of the accommodating part 42, 52, 62 of each wedge (here called the second axis A2) exhibits an inclination with respect to the first axis A1 which differs from one wedge to the other.

In the example represented in FIG. 2, the angle of inclination between the first axis A1 and the second axis A2 is equal to 0 degrees for the first locking cap 40, to 30 degrees for the second locking cap 50, and to 15 degrees for the third locking cap 60.

In this manner, by successively fixing the reference lens to the rod 11 by means of these locking caps 40, 50, 60, it is possible to acquire images of the reference lens with various angles of inclination.

On changing locking cap, the risk is then of losing the datum of the reference lens between the various image acquisitions.

To avoid this, as shown by FIG. 2, the locking caps 40, 50, 60 are manufactured in such a way that the point of intersection between the first and second axes A1, A2 is always situated at the same position with respect to the gripping part 41, 51, 61 of the locking cap.

In this manner, by placing each time the boxing centre of the reference lens at the level of this point of intersection, one ensures that the datum of the reference lens is properly retained (this datum thereafter being retained for the machining of the lens).

In this instance, this point of intersection will be situated at a given distance from the upper face of the accommodating part 42, 52, 62, this distance corresponding to the thickness of the plate 91 of the locking gland 90 and of the double-sided self-adhesive tape used.

As shown by FIG. 5, the boxing frame 110 of the reference lens 100 will be defined here as being the rectangle which circumscribes the outline 101 of the image 100A of the reference lens 100 viewed face-on, and two of whose sides are parallel to the horizon line of the lens. The boxing centre of the reference lens will be then defined as the point which is situated at the centre of the boxing frame 110, on the front face of this reference lens 100.

Here, the locking caps 40, 50, 60 will be manufactured either on request, by means of a 3D printer or of any other suitable technique (fast prototyping, etc.), or en masse by moulding of a plastic.

According to a variant of the invention represented in FIG. 4, provision could be made to use one and the same locking cap 40 to fix the reference lens, in which case the support 10 will have to be mounted mobile with respect to the chassis 2 so as to be able to acquire inclined images of the reference lens.

The support 10 will preferably be mounted mobile with respect to the chassis 2 with at least two mobilities of rotation about two distinct axes, and two mobilities of translation along two distinct axes.

In this variant, the rod 11 is not fixed to the chassis 2 of the machine for acquiring images 1, but it is mounted on the chassis 2 with two mobilities of rotation about two non-parallel axes A6, A7.

This rod 11 is thus mounted mobile in rotation about a first axis A6 which is perpendicular to the principal axis A3 of the rod 11. This first axis A6 is in practice horizontal.

The rod 11 is furthermore mounted mobile in rotation about a second axis A7 which is perpendicular to the first axis A6. In practice this second axis A7 coincides with the principal axis A3.

To confer these two mobilities upon it, the rod 11 rises from a plate 12, which is mounted mobile in rotation (about the principal axis A3) on a plinth 13, this plinth 13 being itself mounted mobile in rotation (about the first axis A6) on a stand 14 placed on the chassis 2.

Here, the stand 14 exhibits a U shape, with a plane lower part which rests on the chassis 2, and two lateral uprights which rise above the chassis 2.

The plinth 13 is then linked to this stand 14 by two lateral arches in the form of inverted V shapes, whose ends are fixed to the plinth 13 and whose apexes carry pivoting studs mounted in two smooth bearings of the stand 14.

The mounting of the studs in the smooth bearings of the stand 14 is tight so that, on the one hand, the optician can manually tilt the plinth 13 about the first axis A6, and that, on the other hand, once tilted, the plinth 13 remains in an inclined position and does not return naturally to the initial position.

The plate 12 comprises for its part a circular seat which rests on the upper face of the plinth 13. Provided, hollowed out in the upper face of the plinth 13 and in the circular seat of the plate 12, are facing annular furrows which make it possible to accommodate an annulus for guiding the rotation of the plate 12 about the principal axis A3.

In this manner, by adjusting the angular position of the plate 12 about the principal axis A3 and that of the plinth 13 about the first axis A6, it is possible to tilt the reference lens fixed to the locking accessory 40 into an inclined position with respect to the optical axis A4 of the image sensor 30, so as to acquire inclined images of the reference lens.

It is also possible to displace the stand 14 by sliding it on the chassis 2, so as to be able to place the axis of the rod 11 on the optical axis A4 of the image sensor 30, or to distance it from the latter.

As a variant, provision could be made to use electric motors to automatically actuate the mobilities of the support 10 with respect to the chassis 2. Here again, to avoid any problem of change of datum during the pivoting of the plinth 13 about the first axis A6, the support 10 is designed in such a way that the point of intersection of the first axis A6 and of the principal axis A3 is situated at a given distance from the upper face of the accommodating part 42 of the locking accessory 40, this distance corresponding to the thickness of the plate 91 of the locking gland 90 and of the double-sided self-adhesive tape used.

It will be noted moreover in FIG. 4 that in this variant, the mirror 70 is fixed to the end of one of the uprights of the stand 14.

Represented in photos 3, 5, 7 and 9 of FIG. 8 are four inclined images of the reference lens 100 bare (that is to say removed from the spectacle frame) which are acquired with the aid of the machine for acquiring images 1. In photo 1 of this FIG. 8, a face-on image of the bare reference lens 100 has been represented.

Represented in the other photos are corresponding images of this reference lens 100 (face-on, side-on, and inclined view), when it is mounted in its spectacle frame 150.

To drive the various members of the machine for acquiring images 1, there is provided a computer (not represented) comprising a processor, a random-access memory (RAM), a read-only memory (ROM), analogue-digital converters, and various input and output interfaces.

By virtue of its input interfaces, the computer is suitable for receiving from various man/machine interfaces (touchscreen, button, etc.) input signals relating to the desire of the optician. The optician can thus control the turning on of the lighting source 20, the acquisition of an image by the image sensor 30, the processing of the acquired images, the switching on of the electric motors, etc.

In its random-access memory, the computer stores the various acquired images of the reference lens.

In its read-only memory, the computer stores software for processing the acquired images, which makes it possible to generate trimming parameters for a brand new lens.

Finally, by virtue of its output interfaces, the computer is suitable for transmitting these trimming parameters to at least one machine for trimming optical lenses.

To devise a guideline for trimming a brand new lens, several steps are thus undertaken. The principal steps of this method are as follows:

a) a step of removing the reference lens 100 and of fixing this reference lens 100 onto the support 10 of the machine for acquiring images 1, b) a step of acquiring, with the image sensor 30, at least two images of the reference lens 100 viewed from two different angles, c) a step of processing the acquired images so as to deduce therefrom trimming parameters for the said brand new lens, and d) a step of devising the trimming guideline as a function of the said trimming parameters.

At this juncture, it will be specified that the trimming guideline is generally devised by the trimming machine itself, on the basis of various trimming parameters. Indeed, the trimming guideline will be devised as a function of the kinematics of the trimming machine concerned, so that it cannot generally be devised upstream.

The implementation of steps a) to c) of the aforementioned method can be set forth in detail. Step d), well known to the person skilled in the art, will on the other hand not be described in detail here.

In step a), the optician removes one of the two reference lenses 100 from the spectacle frame 150, so as to be able to acquire images of the bare reference lens 100, on which images the whole of the outline of this reference lens 100 appears.

Here, it will be considered that the optician has a machine for acquiring images 1 comprising a support 10 of the type of that represented in FIG. 4. Of course, the implementation of the method would be substantially the same with a support 10 of the type of that represented in FIG. 1.

After having extracted the reference lens 100 from its frame, the optician fixes the locking gland 90 onto the reference lens 100 by means of a double-sided self-adhesive tape, while taking care that the axis of the pin 92 passes through the boxing centre of the reference lens 100. Markings provided on the lens and on the locking gland 90 to identify the boxing centre and the axis of the pin 92 make it possible to facilitate this operation.

The optician can as a variant employ a centring-locking device, the use of which is well known moreover and makes it possible to obtain more precise results.

According to another variant, the optician could use a pneumatic locking gland, taking the form of a sucker to be attached to the lens and to be fixed to the latter by means of a vacuum pump.

Here, the optician thereafter attaches the locking gland 90 furnished with the reference lens 100 to the locking accessory 40 fixed to the end of the rod 11.

He thereafter places the cradle 12 of the support 10 in a straight initial position (in which the principal axis A3 of the rod 11 coincides with the second axis A7).

Then, the machine for acquiring images 1 is ready to acquire images of the reference lens 100.

In step b), the optician commands the acquisition of images of the reference lens 100, via any means of entry with which the machine for acquiring images 1 is equipped (keyboard, touchscreen, etc.).

During this step, the image sensor 30 is commanded to acquire a face-on image 100A of the reference lens 100 (see FIG. 5).

The computer thereafter commands the displacement of the image sensor 30 from its base position to its retracted position, via for example a pinion-rack system controlled by an electric motor. The computer thereafter commands the acquisition of a side-on image 100B of the reference lens 100.

The computer thereafter commands the return of the image sensor 30 to base position.

When the reference lens 100 exhibits drill holes, the optician then manually inclines the cradle 12 of the support 10 in such a way that one of the drill holes is positioned substantially vertically. He thereafter commands the acquisition of a new inclined image of the lens. He proceeds in the same manner for all the other drill holes.

As a variant, when the inclination of the cradle is controlled by an electric motor, the inclination guideline dispatched to the electric motor can be computed automatically by the computer.

It can in particular be computed as a function of the shape of the drill hole in the face-on image (in this face-on image, the hole exhibits an oblong and non-circular shape). Indeed, it is possible to determine in this face-on image the orientation of the drill hole, and to deduce therefrom an inclination guideline to be dispatched to the electric motors.

Thus, at this juncture, if the reference lens 100 does not exhibit any drill hole, the random-access memory of the computer stores at least two images of the reference lens 100 viewed face-on (that is to say viewed from the front face) and viewed from the back (that is to say viewed from the rear face). On the other hand, if the reference lens 100 exhibits for example four drill holes, the random-access memory of the computer stores six images of the reference lens 100.

Once these images have been acquired, the optician remounts the spectacle frame 150 on the reference lens 100, whilst the latter is still mounted on the rod 11.

As is apparent in FIG. 8, he can thus acquire other images of the reference lens 100 mounted in its spectacle frame 150.

In practice, the optician commands the acquisition of two other images: a face-on image and a side-on image of the reference lens 100 mounted in its spectacle frame 150.

Finally, the optician commands the commencement of the processing of the images acquired by the computer.

If the images have been acquired with the aid of a non-telecentric objective, the first processing operation consists in redimensioning the stored images.

Indeed, in this case, the distance between the objective and the reference lens 100 varies from one point to another of the lens, thus generating a distortion of the acquired image that should be corrected in order to obtain reliable measurement results.

In the case where the objective used is telecentric, this first operation is irrelevant.

Here, this first operation then consists in correcting the coordinates of each characteristic point of the acquired image.

The preliminary to this operation is to determine the curvature of the reference lens 100, this curvature making it possible thereafter to determine the distance separating the image sensor 30 from the reference lens 100, and this will make it possible to rescale each image.

To determine this curvature, it will be possible to acquire the radius of curvature of the convex front face of the reference lens 100 either by reading it from a database, or by measuring it with the aid of a suitable apparatus, or by computing it on the in-profile lens image.

Indeed, as shown by FIG. 5, by detecting the shape of the outline of the reference lens viewed side-on, the computer can determine the radius of curvature of the convex front face of the reference lens 100 (which is considered to exhibit a spherical cap shape).

Thereafter, to properly understand how the computer operates the operation of scaling the acquired images, attention may be turned to a point P that can be charted in the face-on image 100A and in the side-on image 100B of the reference lens 100 (see FIG. 5).

One then seeks to determine the three-dimensional coordinates $X_{mm}$, $Y_{mm}$, $Z_{mm}$ of this point P, expressed in millimeters, whereas only the two-dimensional coordinates ($X_{Z1}$, $Y_{Z1}$) and ($X_{Z2}$, $Z_{Z2}$) of this point P are available and are read off in pixels on the two images 100A, 100B.

It is possible to write the following system of six equations:

$$X_{mm}=X_{Z1}*S_{Z1},$$

with $S_{Z1}$ the height of the point P with respect to the boxing centre (which is deduced from the curvature of the lens), $$Y_{mm}=Y_{Z1}*S_{Z1},$$

$$S_{Z1}=a*Z_{mm}+S_0,$$

a and $S_0$ being two known constants (determined during the calibration of the machine for acquiring images 1), $$X_{mm}=X_{Z2}*S_{Z2},$$

with $S_{Z2}$ the horizontal gap between the point P and the boxing centre (which is deduced from the curvature of the lens), $$Z_{mm}=Z_{Z2}*S_{Z2},$$

$$S_{Z2}=a*(Y_{mm}-(L1+L2))+S_0,$$

L1 and L2 being two known constants (determined during the calibration of the machine for acquiring images 1).

In practice, only the result of solving this equation system is stored in the read-only memory of the computer. This result is as follows:

$$Y_{mm}=[1/(1-Y_{Z1}*a^2*Z_{Z2})]*[Y_{Z1}*S_0*(1+a*Z_{Z2})-Y_{Z1}*a^2*Z_{Z2}*(L1+L2)]$$

$$Z_{mm}=Z_{Z2}*(a*(Y_{mm}-(L1+L2))+S_0)$$

$$X_{mm}=X_{Z1}*(a*Z_{mm}+S_0).$$

By applying this result to all the characteristic points of the image, the computer can then redimension the acquired images so as to obtain undeformed results despite the use of a non-telecentric objective.

Once the images acquired have been redimensioned, the second operation consists in processing the images of the bare reference lens 100.

The first of the processed images is the face-on view image 100A.

Such a face-on view image 100A, acquired by the image sensor 30 and redimensioned by the computer, has for example been represented in FIG. 6.

In order to obtain trimming parameters to be transmitted to a trimming machine, the computer will examine the outline 101 of the face-on view image 100A of the reference lens 100, it will determine the zone or zones of the lens which will be covered by the spectacle frame, and it will characterize the drill hole or holes provided in the reference lens 100.

In the face-on view image 100A, the outline 101 of the reference lens 100 exhibits convex zones and two concave zones which are localized. This outline 101 is then characterized by a plurality of points which extend along its contour, and which are regularly distributed over the latter. The two-dimensional coordinates of these points will form first trimming parameters to be transmitted to the trimming machine.

The computer will thereafter process in combination the face-on view images of the bare reference lens 100 and of the reference lens 100 mounted in its spectacle frame 150.

It will thus be able to determine the zone situated inside the outline 101 which corresponds to the zone of the reference lens 100 which is covered by the spectacle frame 150. This zone 105 is represented in FIG. 7.

For this purpose, by charting the position of the outline of the spectacle frame 150, the computer will overlay this outline onto the face-on view image 100A of the bare reference lens 100, and thus characterize this zone 105.

It will thus be able to determine the zone or zones of conflicts situated inside the outline 101 which correspond to the locations where the brand new lens will run the risk of interfering with the spectacle frame 150 and create collisions for example with the nose pads or the front and/or rear edges of the frame. Indeed, in contradistinction to the reference lens 100 which generally exhibits a reduced thickness, the brand new lens will be able to exhibit a significant thickness at the edge, which could generate a conflict between the brand new lens and the spectacle frame 150.

By determining the three-dimensional shape of a part of the spectacle frame 150 with the aid of the face-on and side-on view images acquired, the computer will then be able to determine whether there is a risk of such a conflict occurring, and if such is the case, it will be able to determine second trimming parameters, aimed at creating an inclined bezel in the zones of conflict with the nose pads and/or at making it possible to machine a shoulder (or an indentation) in the edge of the brand new lens as specified in U.S. Pat. No. 7,643,899. Such machining will thus make it possible to avoid any problem in mounting the brand new lens in the spectacle frame 150.

The computer will thereafter process the face-on view image 100A of the bare ophthalmic lens 100 so as to determine whether this lens exhibits one or more drill holes.

If such is the case, the computer will select, from among the various images acquired of the bare reference lens, that on which the outlines of the front and rear openings of the drill hole considered are the closest. This image will correspond to that for which the drill hole was oriented substantially in the axis of the image sensor 30.

Then, on this image, the computer 100 will compute the shape and the position of this drill hole. The shape and the position of each drill hole will form third trimming parameters.

After having characterized all the drill holes situated in the reference lens 100, the computer processes the side-on view image 100B of the reference lens 100.

The present invention is in no way limited to the embodiment described and represented, but the person skilled in the art will be able to afford any variant thereto in accordance with the spirit thereof.

Provision could for example be made for the lens support to be stationary and for the image sensor to be mounted mobile in rotation on the chassis of the machine for acquiring images, about an axis passing through the boxing centre of the reference lens. In this manner, this image sensor will be able to acquire a face-on image of the reference lens, and then it will be able to pivot so as to acquire inclined and side-on images of the reference lens, without it being necessary to displace the reference lens.

The invention claimed is:

1. A machine for acquiring images of optical lenses, comprising:
   a support for a reference optical lens,
   a light source,
   an image sensor suitable for capturing a first image of the reference optical lens carried by the support, viewed from a first angle,
   wherein the said image sensor is suitable for capturing a second image of the reference optical lens carried by the support, viewed from a second angle distinct from the first angle; and
   wherein the said support comprises a stand and a set of at least two locking caps, each locking cab comprising:
      a gripping part for its fixing onto the said stand according to a first axis, and
      an accommodating part for its to the said reference optical lens according to a second axis, the angle of inclination between the first axis and the second axis varying from one locking cap to the other.

2. The machine for acquiring images according to claim 1, in which the said image sensor and the said light source are disposed on either side of the reference optical lens carried by the support.

3. The machine for acquiring image according to claim 1, in which the said image sensor and the said light source are disposed on one and the same side of the reference optical lens carried by the support.

4. The machine acquiring images according to claim 1, in which there is provided a chassis and in which the support comprises a locking cap for the fixing of the said reference optical lens, which is mounted mobile with respect to the chassis with at least two mobilities of rotation about two nonparallel axes.

5. The machine acquiring images according to claim 1, in which there is provided a mirror and in which the image sensor and the support are mounted mobile with respect to one another, between a first position in which the support is situated in the field of the image sensor and a second position in which the mirror is situated in the field of the image sensor.

6. The machine for acquiring images according to claim 1, in which the image sensor comprises a non-telecentric objective.

7. The machine for acquiring images according to claim 1, in which, the said at least two images are acquired successively, a mirror being placed in the optical path of the image sensor between the two image acquisitions.

8. The machine for acquiring images according to claim 2, in which there is provided a chassis and in which the support comprises a locking cap for the fixing of the said reference optical lens, which is mounted mobile with respect to the chassis with at least two mobilities of rotation about two non-parallel axes.

9. The machine for acquiring images according to claim 3, in which there is provided a chassis and in which the support comprises a locking cap for the fixing of the said reference optical lens, which is mounted mobile with respect to the chassis with at least two mobilities of rotation about two non-parallel axes.

10. The machine for acquiring images according to claim 2, in which there is provided a mirror and in which the image sensor and the support are mounted mobile with respect to one another, between a first position in which the support is situated in the field of the image sensor and a second position in which the mirror is situated in the field of the image sensor.

\* \* \* \* \*

UNITED STATES PATENT AND TRADEMARK OFFICE
CERTIFICATE OF CORRECTION

PATENT NO. : 10,406,649 B2
APPLICATION NO. : 15/328507
DATED : September 10, 2019
INVENTOR(S) : Vincent Anatole and Cedric Sileo Page 1 of 1

It is certified that error appears in the above-identified patent and that said Letters Patent is hereby corrected as shown below:

On the Title Page

"(73) Assignee: ESSILOR INTERNATIONAL, Charenton-le-Pont (FR)"
Should be replaced with:
-- (73) Assignee: Essilor International, Charenton-le-Pont (FR) --.

Signed and Sealed this
Tenth Day of December, 2019

Andrei Iancu
*Director of the United States Patent and Trademark Office*